June 22, 1965 G. C. MAYFIELD 3,190,662

MULTI-PIECE PISTON RING ASSEMBLIES

Filed April 13, 1964 7 Sheets-Sheet 1

INVENTOR:
GEORGE C. MAYFIELD

BY [signature]

ATTORNEY.

June 22, 1965 G. C. MAYFIELD 3,190,662

MULTI-PIECE PISTON RING ASSEMBLIES

Filed April 13, 1964 7 Sheets-Sheet 2

INVENTOR:
GEORGE C. MAYFIELD

BY John H Burkenland

ATTORNEY.

INVENTOR:
GEORGE C. MAYFIELD

BY John H. Sutherland
ATTORNEY

MULTI-PIECE PISTON RING ASSEMBLIES

Filed April 13, 1964 7 Sheets-Sheet 4

INVENTOR:
GEORGE C. MAYFIELD
BY John H. Sutherland
ATTORNEY.

INVENTOR:
GEORGE C. MAYFIELD
BY John H. [signature]
ATTORNEY.

INVENTOR:
GEORGE C. MAYFIELD

BY John H. [signature]
ATTORNEY.

INVENTOR:
GEORGE C. MAYFIELD
BY John A. Sutherland
ATTORNEY

United States Patent Office 3,190,662 Patented June 22, 1965

3,190,662

MULTI-PIECE PISTON RING ASSEMBLIES

George C. Mayfield, 8518 Antler Ave., Richmond Heights, Mo.

Filed Apr. 13, 1964, Ser. No. 359,518
10 Claims. (Cl. 277—140)

The invention relates to full floating, multi-piece, piston ring assemblies of the non-bottoming type based upon a novel form of spacer-expander control ring element exerting radial and axial control forces selectively or simultaneously on a ring element by integrally formed cantilever-like variable rate springs acting at a muitiplicity of control points on the inner periphery of a ring element, all as shown in my prior application, Serial No. 46,482, filed August 1, 1960, for "Multi-Piece Piston Ring Assemblies," and now abandoned, of which this is a continuation-in-part. The spacer-expander control ring element is preferably a circumferentially non-compressible carrier ring with yieldable cantilever spring fingers, and all of the rings in the assembly are hereinafter described as having an inner and outer periphery which are the opposite circumferential faces on the rings and also as having radial faces which are the radial side faces of the rings wherever these terms are used.

According to this invention, the piston ring assembly has a split spacer-expander control ring element and a split ring, or rail element, both of which are slidable over the piston into a ring groove. When the split ring and spacer-expander control ring element are so assembled in the groove, opposed radial faces thereof lie substantially parallel to one another and to the side, or sides, of the ring groove. At the inner periphery of the split spacer-expander control ring element are one or more separate rows of offset cantilever spring members, which extend to one side or the other of the control ring at its inner periphery and extend lengthwise in a chordwise manner to the spacer-expander control ring element. Each cantilever spring preferably has a relatively stiff resilieint mounting near one end and is more resilient lengthwise from mounting to end. Both cantilever spring and spring mounting for the cantilever spring are integrally formed at one periphery of the spacer-expander ring element, which is, in this case, a stamping from spring strip sheet metal. The inner periphery of the ring, or rail element, is forced inwardly of the piston groove by the cylinder walls into contact at its inner periphery with the ends of the cantilever springs maintaining the ends of the split expander element in abutting relation, so that the expander element is a carrier for the integral cantilever springs and an axial support for the rail or rails, and the cantilever springs become the yieldable radial support for the rails. Clearance between the inner preiphery of the ring assembly, when compressed, and the bottom of the piston groove makes the ring assembly full floating or non-bottoming. It follows that the cantilever springs become the resilient radial control of a ring element, or rail, which has its radial face lying parallel to the upper or lower walls of a ring groove in a piston, and the radial face of the expander ring element. Each cantilever spring has a variable spring rate. For example, resistance to radial inward movement of the rail distorts the cantilever springs lengthwise, and as the deflection of the cantilever springs increase, the resistance of the mounting or root for the canitlever springs become additive, although it need not engage the inner periphery of the rail, or ring element, to perform this function.

Control of the ring element, or rail, in an axial direction of the piston and within the ring groove of the piston, is obtained as a result of the degree of eccentric force exerted radially on the rail by the reaction of the cantilever springs resisting compression of the rail, or ring element, in the piston groove. The eccentricity of the cantilever springs with respect to the backbone or ring portion of the spacer-expander control ring element on which the springs are formed cause a twisting action in the ring portion of the spacer-expander control ring element which will be concentrated in zones of the ring portion adjacent the location for the mounting of the cantilever springs. This twisting action tends to move the outer periphery of the ring portion of the spacer-expander control ring element in an axial direction against the radial face of the rail, or ring element, to hold one face of the ring element against the radial side face of the piston groove. The degree of twisting force exerted by the cantilever springs on the backbone or ring portion of the control ring element will always depend upon the degree of cantilever spring deflection caused by radial compression of the rail, which is a variable so that the axial force exerted by the ring portion of the spacer-expander control ring element on the rail is a dependent variable.

On the other hand, the spacer-expander control ring element can be constructed, as above stated, of springy material which is also thin enough to distort in response to the eccentric twisting forces mentioned, in which case the eccentric forces mentioned can distort the backbone or ring portion of the spacer-expander ring element axially into a wavy shape. That is, the radial face of the ring portion of the spacer-expander ring element, may assume an undulating non-planar contour forcing the side of the rail and the side wall surfaces of the piston groove into intimate contact. Here again, the degree of twisting force exerted on the ring portion of the control ring element by the cantilever springs will always depend upon the degree of radial deflection of the cantilever springs, which is a variable, so that the departure of the ring portion of the spacer-expander control ring element from a shape with true planar radial surfaces is also a variable depending on cylinder wall diameter and contour. The changes in contour causing a breathing action between the ring element, the ring portion of the spacer-expander control ring element and the walls of the groove in the piston.

Axial control of the ring element, or rail, by the spacer-expander control ring element is also possible by inclining the contact surfaces of the cantilever springs axially or with respect to the vertical, where each of said cantilever springs contacts with the surface of the inner periphery of the rail, or ring element, engaged by these contact surfaces, or vice versa. Then as the radial compression of the rail, or ring element, varies, so will the wedging or cam action between these contacting surfaces vary. This provides a separate manner for controlling the axially directed force applied to the ring or rail element. As will be appreciated from the foregoing brief description, the ring assembly according to this invention provides for separate calibration of control forces applied to the ring, or rail element. Radial control and axial control may be separately varied by a change in spring rate and a change in the eccentricity of the reaction of the cantilever springs. Axial control exerted by the spacer-expander control ring element on the ring element is not only controllable in degree, but also controllable in zone of application. The control axially may be exerted primarily at the outer periphery of the ring, or rail element, at the inner periphery of the ring, or rail element, at both, or uniformly distributed from the inner periphery to the outer periphery of the ring, or rail element. The selection, the degree and the combination of control forces provided in any one ring assembly can therefore be selected to suit ring environment, and any combination will provide some degree of breathing action to maintain full floating action of the ring assembly.

From the foregoing, it is readily apparent that one of the objects of this invention is to provide a piston ring assembly primarily for internal combustion engines, which includes a separate spacer-expander ring, or control ring, capable of being designed to meet specific conditions requiring independent selection of the degree or manner of application for applying control forces between the control ring and the ring element, or rail.

Another object of the invention is a piston ring assembly, which because of its characteristics is suitable as a compression ring, an oil control ring, or as a combination ring.

The principles above discussed can be embodied in many different structural forms. It can be applied to ring assemblies with spacer-expander rings, for individual or multiple rails, and makes possible assemblies for controlling compression, controlling oil, or combined control ring assemblies for both these purposes.

The following is a description in such full, clear, concise and exact terms as to enable any person skilled in the art to make and use the invention when taken in conjunction with the accompanying drawings in which.

Figure 1:
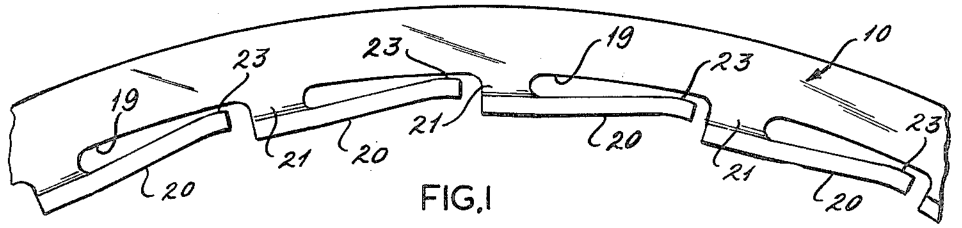
FIG. 1 is a fragmentary plan view of a single spacer-expander ring with a single row of cantilever springs disposed about its inner periphery on one side only.

One of the basic assemblies of this invention is disclosed in FIGS. 1–6 of the drawings. The ring, therein illustrated and hereinafter described in detail, may be referred to generally as a compression type of ring. Usually there are two such rings, at least, mounted at the head end of each piston for an internal combustion engine. This basic form of ring assembly consists of two parts, a spacer-expander control ring, such as illustrated at 10, and a compression ring, indicated as 11 in these views. The spacer-expander control ring 10 is split at 12, so that it may be expanded over the exterior of the piston and moved into the ring groove. When the spacer-expander control ring 10 is in actual operation, its ends but at 12, and the butting ends at 12 of the control ring 10 are fixed by the interlock-abutment 12 to determine its minimum diameter. This minimum diameter is always greater than the diameter of the bottom of the ring groove in the piston. In other words, the control ring is full floating in the groove of the piston and may take up any position depending upon the forces imposed thereon. Normally the control ring position is substantially stationary with respect to the piston, and, if it moves at all, it moves bodily in a direction opposite to the side thrust of the piston on the cylinder wall. The reason for this will appear as this description proceeds. The outer periphery of the control ring 10 preferably terminates within the piston groove, and the outer periphery, here indicated as 15, has no sealing action whatsoever with respect to the cylinder wall. The backbone of the control ring 10 also has an upper radial face 16 and a lower radial face 17. These faces are substantially parallel to one another. In the manufacturing processes quite often employed for forming both the control ring 10 and the expansible ring 11, a strip of suitable cross-section and finished dimensions is wound helically along a mandrel to form a multiplicity of convolutions from one end of the mandrel to the other. While the convolutions are held securely clamped between end abutments, an axial cut is made along the mandrel separating the wound convolutions into separate rings. During the winding operation performed on the mandrel, the finished stock is stretched lengthwise adjacent the outer periphery exposed on the mandrel. Naturally one would expect to find that this stretching had introduced a slight taper radially of each of the separate rings, and such is often the case. Consequently, the radial faces 16 and 17 are sometimes not exactly parallel because of the drawing operation performed, and ring axial width may taper radially outwardly and be as much as a thousandth of an inch in some instances. Consequently, the statement that the faces 16 and 17 are parallel is not absolutely accurate, but they are substantially parallel.

At the inner periphery of the control ring 10 are formed a series of spaced cantilever springs. Preferably, these springs are formed by a notching or stamping operation performed upon the stock of the ring 10 before it is wound upon the mandrel. The cutouts punched in the ring 10, such as indicated in several instances as 19, outline a series of cantilever fingers 20 joined to the control ring 10 at root or tab portion 21. The fingers are subsequently turned out of the plane of the ring by an upsetting operation bending the root 21, so that when the stock for the expander ring is wound upon the mandrel, fingers 20 are free to assume a substantially chordwise position with respect to the circular configuration of the control ring 10. The particular stamping operation, or the particular shape of the dies performing this stamping operation, making the cutouts 19, determine in turn the shape of the fingers 20 and the degree and angle of their offset, and these characteristics may be selectively varied, as will be hereinafter pointed out, to provide a quite unexpected and unobvious function in the performance of the ring assemblies. The aspect ratio of each finger is relatively high, that is the fingers are relatively long and narrow, and, since the material from which they are formed is inherently flexible, each finger 20 becomes an elongated cantilever spring between its root 21 which is also flexible and its tip 23. Tips 23 in turn bear against the inner periphery of the piston ring element 11. This also is a split ring and capable of expansion and contraction. The action of the ring 11, in this respect however, is controlled almost exclusively by the tips of the cantilever fingers 23, which will urge the expansible ring 11 outwardly with a variable force depending primarily upon its displacement radially inwardly of the control ring 10. So that, in action the expansible piston ring element 11 is urged outwardly at a plurality of points about its internal periphery by the tips 23 of the fingers 20 which form cantilever springs of variable rate, that is, as each cantilever spring finger 20 is forced inwardly, the degree of springiness varies due to the reinforcing springiness in the root 21 mounting the finger 20. Also, since the expansible piston ring is lightweight and each of the fingers 20 slender and sensitive to small displacements, the construction provides a ring assembly of great sensitivity due to the low mass of its parts, which will readily and rapidly respond to chainges in ring pressure on the cylinder wall.

As heretofore stated, the ring assembly described is full floating and therefore fully responsive as an assembly to movements of the piston with respect to the wall, which movements are transverse to the center line of the cylinder barrel, but during such movements of the control ring, or the ring assembly as a whole, cylinder wall pressure of the ring is maintained uniform due to the sensitivity of the fingers. The sensitivity of the fingers 20 is, of course, a matter of design which will determine the spring force applied, and it is contemplated that these changes in design fall readily within the concept of this invention. In other words, the profile of the fingers is subject to modification as well as the proportions of the fingers, so that any desired spring rate, or tension, can be readily obtained.

Figures 2, 3:
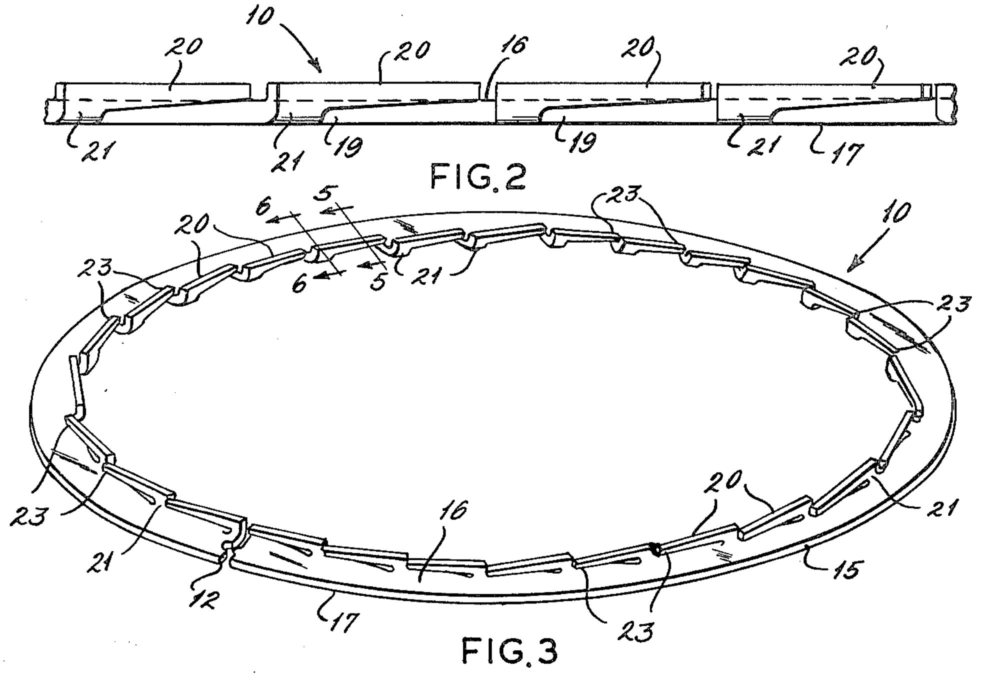
FIG. 2 is a side elevation of a fragmentary section of the same ring shown in FIG. 1.
FIG. 3 is a perspective view of the expander ring, shown in FIGS. 1 and 2.
Figure 4:
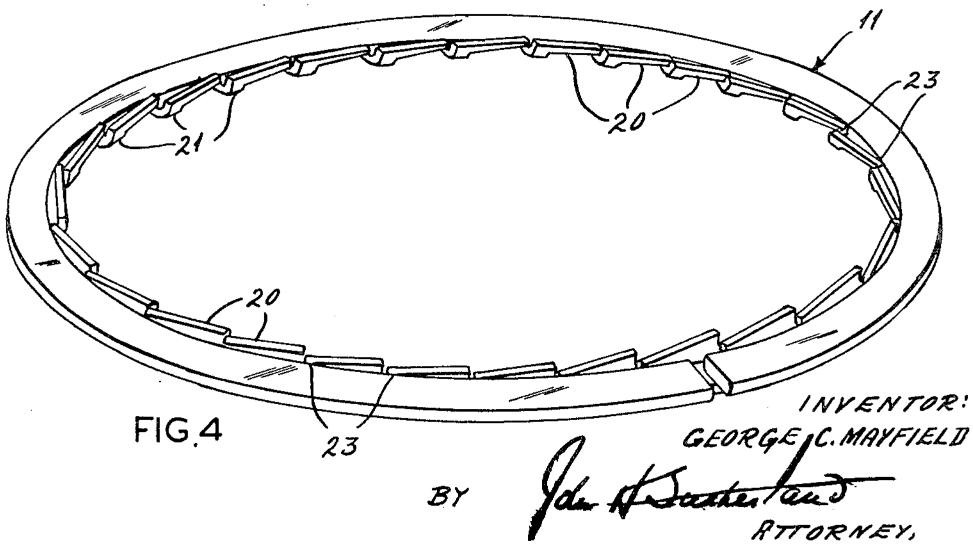
FIG. 4 is a perspective view of a ring assembly including the spacer-expander ring with a single row of cantilever springs with inclined contact faces.
Figure 5:
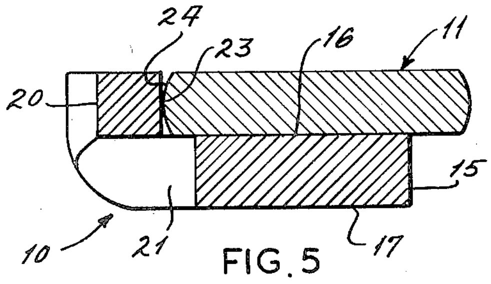
FIG. 5 is a transverse section taken on the line 5—5 of FIG. 3, illustrating a ring assembly using the spacer-expander constructed as shown in FIGS. 1–3.
Figure 6:
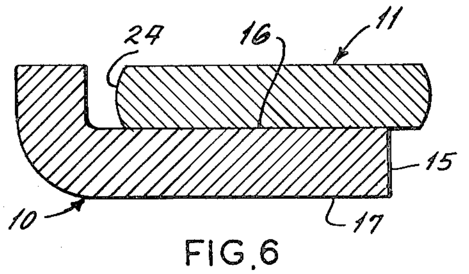
FIG. 6 is a transverse section taken on the line 6—6 of FIG. 3, illustrating the same ring assembly as in FIG. 5.
Figure 9:
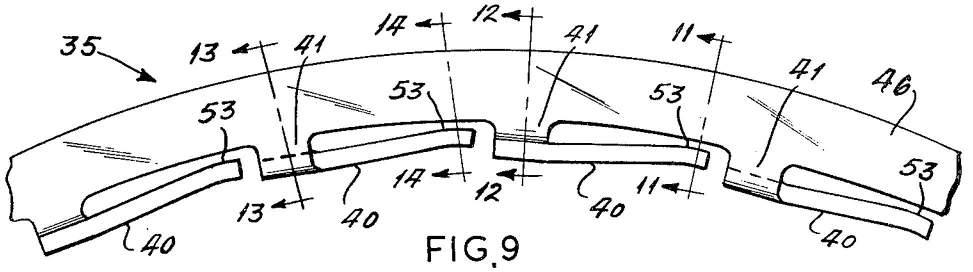
FIG. 9 is a top plan view of an expander ring having cantilever fingers alternately at the top and the bottom sides thereof.
Figure 10:
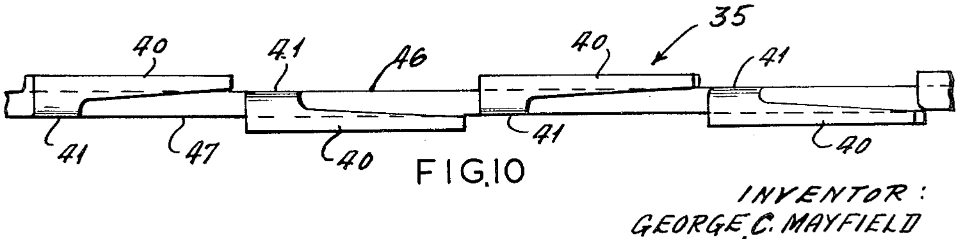
FIG. 10 is a side elevation of a fragmentary section of the same ring shown in FIG. 9.

With reference to FIGS. 1 and 2 specifically, it will be noted that these fingers 20 are uniform in shape and proportion and extend in one direction, but changes in size and shape can be made to obtain the desired action of the fingers on the expansible ring. Hereinafter shown are fingers which extend in opposite directions from the root connection with the control ring, which is one change which can be made in the basic assembly. Others will appear hereinafter with reference to the explanation of FIGS. 7–9, inclusive. The detailed description, so far, of the basic ring assembly has been limited primarily to the construction, or the features of construction, which lend themselves to control functions of the control ring on the expansible ring in a general radial direction with respect to the axis of the piston and of the cylinder barrel. These control functions in a radial direction are important from the standpoint of performing the sealing function of the expansible ring 11 with the cylinder wall. Under any given set of conditions, this radial control by the cantilever fingers can be separately calibrated when the desirable requisites of such a ring assembly are determined. Obviously, finger spacing, length, width, taper, root section and angular contact are variables subject to proper selection and combination to achieve a satisfactory sealing action between the outer periphery of the expansible ring 11 and the cylinder wall. These variables are characteristic of each of the modifications shown in this invention.

Turning now to other features of this invention, providing for sealing action between the piston and the expansible ring 11 as distinguished from the characteristics and features above discussed which control the seal between the expansible ring and the cylinder wall, it is just as important to the satisfactory operation of the ring assembly to provide a satisfactory seal between the ring and the piston as it is between the ring and wall. This requires an entirely different action from the control ring 10 and its action to exert an axial force on the expansible ring 11 holding it in contact with the radial side wall of the ring groove to control the sealing effect between the piston and the expansible ring. The following description will relate therefore to the axial forces imposed upon the expansible ring by the action of the backbone or ring portion of the spacer-expander ring 10.

Figures 7, 8:
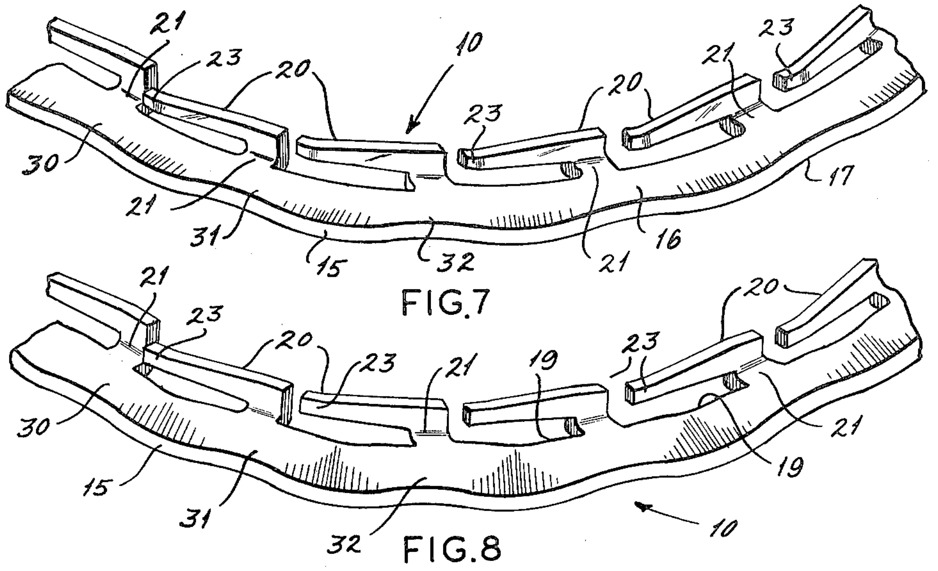
FIG. 7 is a fragmentary perspective view illustrating, in an exaggerated manner, the twisting effect which can be produced on a thin ring section by forces on the cantilever springs due to eccentricity between the contact area on the cantilever springs and the ring of the spacer-expander.
FIG. 8 is a fragmentary perspective view similar to FIG. 7 illustrating another possible effect that might be produced by the twisting effect.

Referring now specifically to FIG. 7, it will be observed that the control function of the cantilever finger is transmitted to the expansible ring from a surface 23 on the cantilever finger, which is planar or flat in an axial direction. The inner face of the expansible ring 11, however, as shown at 24, is generally arcuate in an axial direction. The offset relation of the finger 23 from the top surface 16 of the control ring provides a point of application of force between the finger surface 23 and the ring surface 24, which is offset upwardly above the top surface 16 of the control ring. Since the reactive forces between the faces 23 and 24 are offset from the medial plane through the control ring in an axial direction there will be a turning couple exerted on the ring portion of the spacer-expander ring by the expansible ring 11, when the expansible ring 11 is urged outwardly against the cylinder wall by the cantilever fingers 20. Thus turning couple produces a twisting action along the circumference of the control ring 10 lifting the outer edge 15 of the top surface 16 into contact with the under face of the expansible ring 11. In other words, the twist, or tilt, at the inner periphery of the control ring produces a like twist, or tilt, in the outer periphery of the control ring to force the upper face of the expansible ring 11 against the radial side face of the piston ring groove. The degree of force exerted will be proportional to the lever arms at the point of reaction between the surfaces 23 and 24 and the length, or width, of the ring portion of the control ring in a radial direction. Of course, both of these lever arms are variables, that is, the shape of the contact surfaces 23 and 24 can be such as to change the length of this lever arm and the width, or length, of the ring portion of the control ring 10 can be variable in a radial direction to change the length of the other lever arm. Thus, the proportion between the two can be varied, varying the amount of axial force applied at the outer periphery of the control ring 10 against the under face of the expansible ring 11.

Mechanical characteristics of the particular machinery involved might sometimes make it desirable to apply the axial control force at the inner periphery of the expansible ring 11 rather than the outer periphery, and this basic construction is separately capable of performing exactly the required degree of force at the particular location desired. Thus, axial control by the control ring 10 at the internal periphery of the expansible ring 11 is accomplished, as will be seen in FIG. 4, by merely forming one or the other of the contacting surfaces as a camming surface. As a matter of convenience and of economy, this modification can best be accomplished on the cantilever finger surface 23, and accordingly the root 21 for this modification is not deformed through a complete 90 degree angle, but only through an angle sufficient to provide an upwardly and axially inwardly inclined camming surface at 23. This modification provides an axial component on the inner periphery of the ring 11 directed upwardly due to the reactive forces between the surfaces 23 and 24. It is perfectly possible to vary the camming angle on surfaces 23 and 24 to obtain variation in the axial directed force applied to the inner periphery of the ring 11, and such a change in angle can be made that substantially all of the axial forces exerted on the ring 11 by the control ring 10 are in the region of the inner periphery of the ring 11. Combinations and variation of the camming angle and the offset thus can provide an axial force almost exclusively at the outer edge, or periphery, of the ring 11, the inner periphery of the ring 11, or at both peripheries, inner and outer. Thus, the control ring 10 provides for control of the axial forces applied to the expansible ring 11 both in location and in degree. This same effect may be accomplished in a distinctly different manner as hereinafter described with respect to the modification in FIG. 8.

It is perfectly possible to control the axial forces exerted between the two rings in quite a different manner, as will be seen in FIG. 8. In this modification, the width of the backbone of the ring between the surfaces 16 and 17 becomes the adjusted variable controlling these axial control forces exerted. Since the reactive forces between the surfaces 23 and 24 are offset as heretofore described, the twisting action obtained from the offset can be applied to the backbone or ring portion of the spacer-expander rnig 10 through the root 21, and, by adjusting the distance between the faces 16 and 17, reactive force may produce, in a certain degree, spaced undulations due to the twist which distorts the control ring 10 into a wave formation quite clearly shown at the locations 30, 31, 32, etc., about the periphery of the ring. These undulations are evidence of the axial forces in the ring portion of control ring 10, which may be utilized to control the aixal force applied to the expansible ring 11. It might be remarked here, appropriately, that since the reactive forces between the surfaces 23 and 24 vary, so also will the axial control forces exerted by the ring portion of the spacer-expander ring 10 on the expansible ring 11 and that is true for each of the modifications in FIGS. 7–9. As these forces vary, there will be a breathing action of the ring assembly within the piston groove.

FIGS. 10–17 illustrate the invention above described applied to an oil control ring with spaced rails. This embodiment of the invention does not differ basically from that above described. In FIGS. 9–14, inclusive, a piston ring assembly is shown comprising basically a pair of expansible ring members or rails 29 and 30 and a spacer-expander control ring 35 located therebetween. Control ring 35 is a split ring having abutting ends 32 which come together in fixed interlocked-abutment and determine the minimum diameter for the control ring 35 in the same manner as above described for the previous embodiment. The inner periphery of the backbone or ring portion 35 has spaced cantilever fingers 40 joined to the backbone of the ring 35 by root portions 41. Upper and lower radial faces on the backbone or ring portion 35 are indicated as 46 and 47. In this modification, the cantilever fingers 40 are offset alternately above the surface 46 and below the surface 47, and extend in a sort of chordwise manner with respect to the general circular configuration of the control ring 35. Inner contact faces 53 at the ends of each of the cantilever fingers are the control surfaces which exert the radial pressure on the surfaces 54 and 55, respectively, of the rings 29 and 30, and, in this modification, the control surfaces 53 are shown both vertical as in FIG. 9 and inclined like those in FIG. 15. The particular angle of the surfaces 53 is merely exemplary, and, as heretofore described, this embodiment might, under certain circumstances, require vertical, or axial, planar surfaces 53 or variation in the angle of the surfaces in other respects all as herein aforementioned for the purposes described. The modification shown in FIGS. 11–14 illustrates the offset between surfaces 46 and 47, and 53 and 54, and 53 and 55 which can produce twisting action on the backbone of control rings 35. This pair of offset couples resulting from the force reaction between the surfaces 53 and 54, or 53 and 55, may, if desired, be utilized to produce undulations along the backbone. Of course, this depends upon the rigidity built into the backbone of the control ring 35, but it is contemplated that the effect will be present in some small degree regardless of rigidity and that rigidity only controls the degree.

Figures 11, 12, 13, 14, 15, 16, 17:
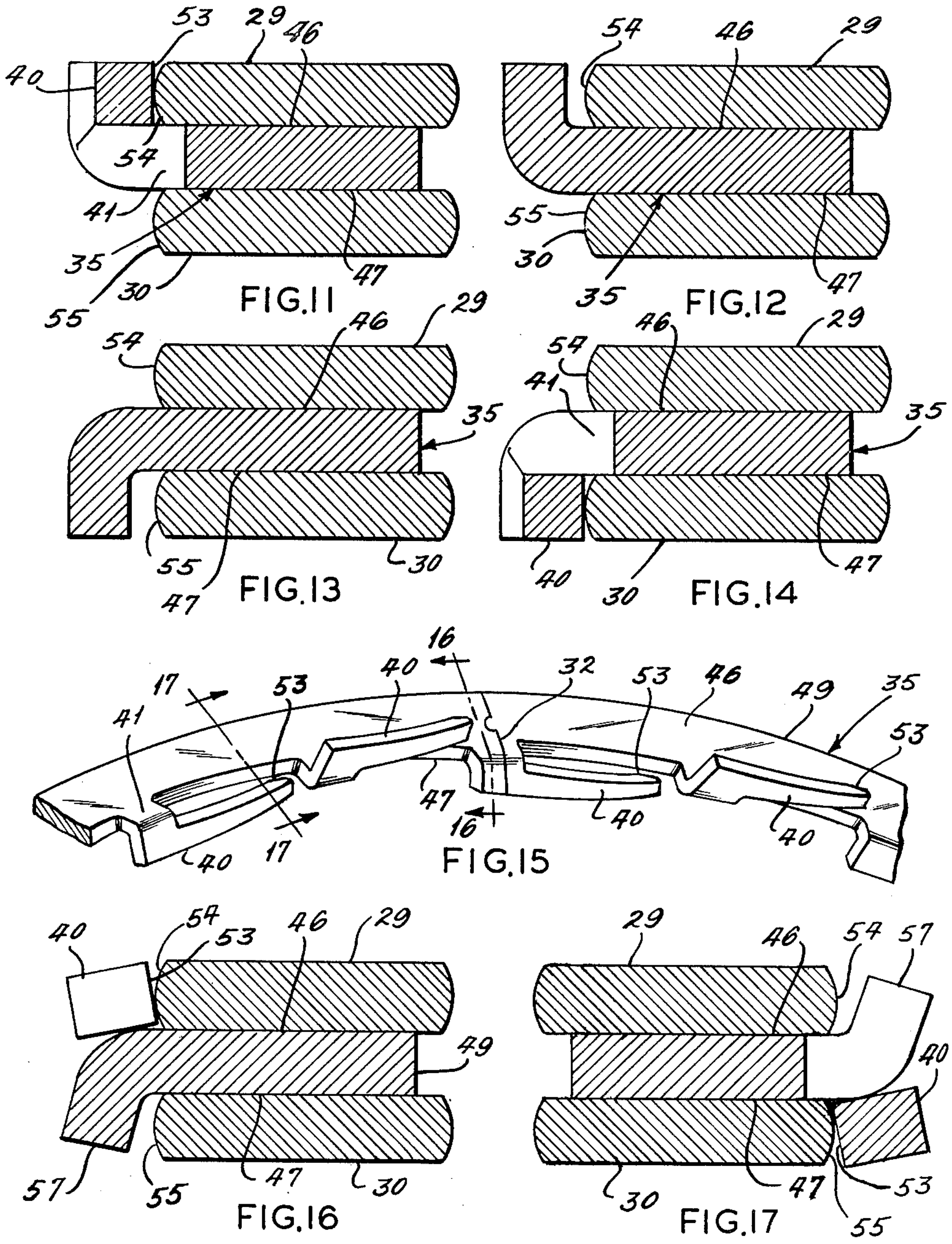
FIG. 11 is a transverse sectional view taken on the line 11—11 of FIG. 9, illustrating a ring assembly using the spacer-expander of FIG. 9.
FIG. 12 is a transverse sectional view taken on the line 12—12 of FIG. 9, illustrating another part of the assembly using the ring in FIG. 9.
FIG. 13 is a transverse sectional view taken on the line 13—13 of FIG. 9, illustrating another part of the assembly using the ring in FIG. 9.
FIG. 14 is a transverse sectional view taken on the line 14—14 of FIG. 9, illustrating another part of the assembly using the ring in FIG. 9.
FIG. 15 is a perspective view of the modification of the spacer-expander shown in FIGS. 9 and 10 illustrating inclined contact surfaces on the cantilever springs.
FIG. 16 is a transverse section on the line 16—16 of FIG. 15 illustrating a ring assembly using the spacer-expander ring of FIG. 15.
FIG. 17 is a transverse section taken on the line 17—17 of FIG. 15 also illustrating a ring assembly using the spacer-expander of FIG. 15.

In FIGS. 15–17, the cantilever springs 40 on the upper side of the backbone or ring portion of control ring 35 have outer contact faces 53 inclined inwardly in an axially upward direction and springs 40 on the lower side of the backbone or ring portion of the control ring 35 inclined inwardly in an axially downward direction for the purpose of axial control, as heretofore described. The action of fingers 40 is the same as the action of fingers 20 in FIG. 4.

FIGS. 18-21 illustrate still another embodiment of a rail type of ring assembly adapted primarily as an oil control ring. According to this embodiment, the control ring 60 is U-shaped in cross-section providing two substantially parallel legs 61 and 62 joined by a backbone or bight portion 63. This also is a non-bottoming full floating ring assembly, and the control ring 60 is split at 52 for obvious reasons required in installation. When in operation, however, the opopsite ends of the ring abut at 52 to determine the minimum diameter of the control ring 60. The preferred method of forming the control ring 60 is to start with a flat strip of material, which can be suitably punched out along parallel lines to produce openings 64 and 65 which define the contour of the cantilever fingers. When subsequently formed into the U-shape shown in FIGS. 18, 20 and 21, the cantilever fingers form continuations of the backbone or bight portion 63, and each has a root portion 66 and 67, respectively. Top and bottom cantilever fingers 69 and 70 in FIG. 18 extend in the same direction, and are offset respectively from the upper surface 71 of leg 61 and 72 of leg 62. The legs 61 and 62 are not exactly parallel, but are divergent an amount, such as 3–6 thousandths, in order to make the outer surfaces 71 and 72 divergent outwardly. Split expansible ring type rails 75 and 76 are supported on the surfaces 71 and 72, and are yieldingly urged against the cylinder wall by the cantilever fingers 69 and 70. The root portions 66 and 67 for the cantilever fingers form a yielding support for the flexing action of the cantilever fingers which takes place, and, since the root portions are opposite one another, top and bottom in this form of the control ring 60, the forces are balanced and the effect of their offset is entirely isolated from the legs 61 and 62. In this respect, this embodiment differs from those heretofore described, but it is perfectly possible to provide cam surfaces on the contact ends of the cantilever fingers for the same purposes as heretofore described.

Figure 18:
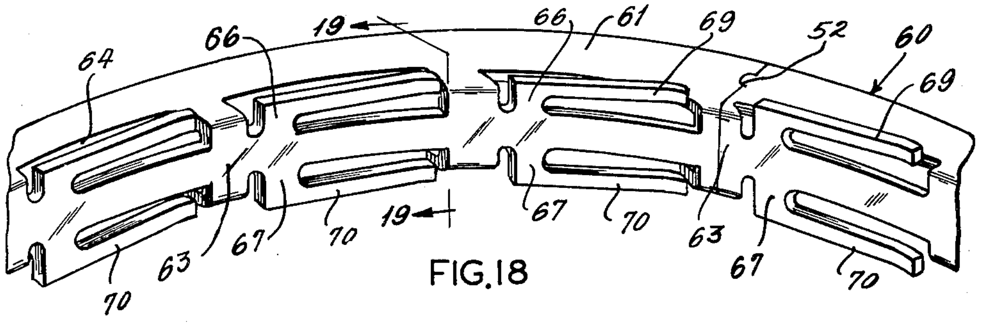
FIG. 18 is a perspective view of a spacer-expander ring illustrating a modified form for control of two rails.
Figure 20:
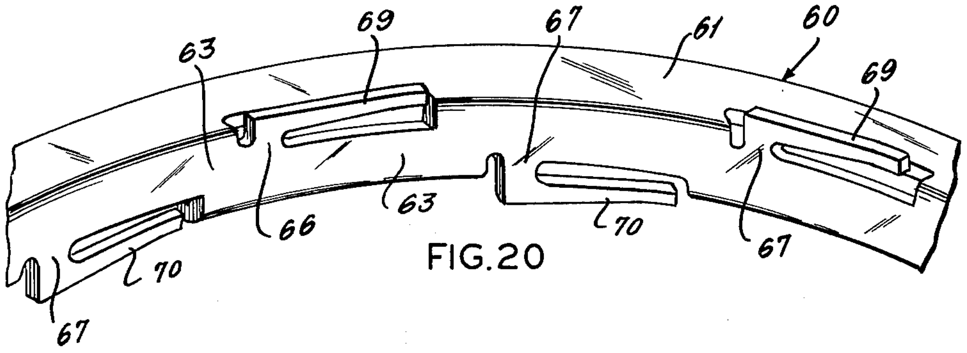
FIG. 20 is a perspective view of a spacer-expander ring illustrating a modification of the ring shown in FIG. 18.

The embodiment shown in FIG. 20 is substantially identical with that heretofore described and illustrated in FIG. 18, and corresponding parts thereof are consequently given the same reference character. The sole distinction between this form and the prior one in FIG. 18 is that the cantilever fingers are located in staggered relation top and bottom of the ring 60 instead of being axactly opposite. In this embodiment as in the prior one shown in FIG. 18, the expander ring control is exercised by the radial pressure between the ends of the fingers 69 and 70 and the inner periphery of the rings 75 and 76 at top and bottom.

Figure 21:
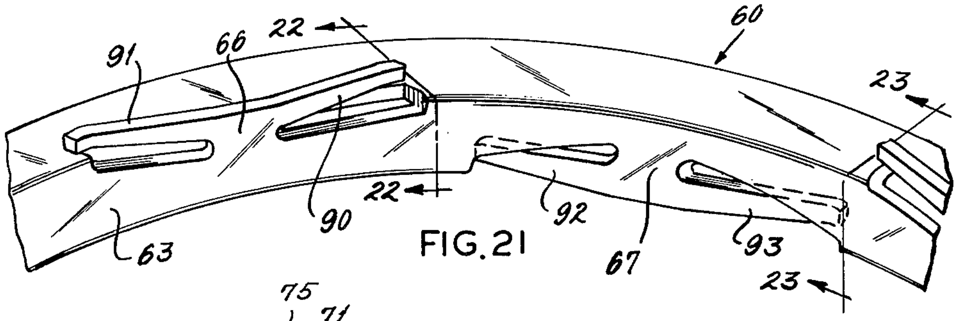
FIG. 21 is a perspective view of still another modified form of spacer-expander, such as shown in FIGS. 18 and 20.
Figure 19:
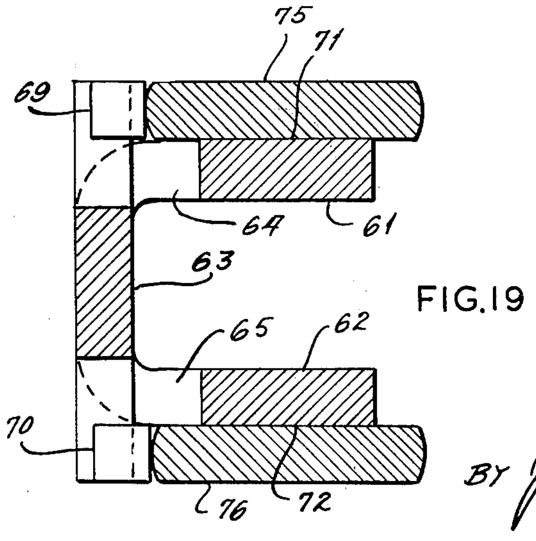
FIG. 19 is a transverse section on the line 19—19 of FIG. 18 illustrating a ring assembly with a spacer-expander of FIG. 18.
Figures 22, 23, 24:
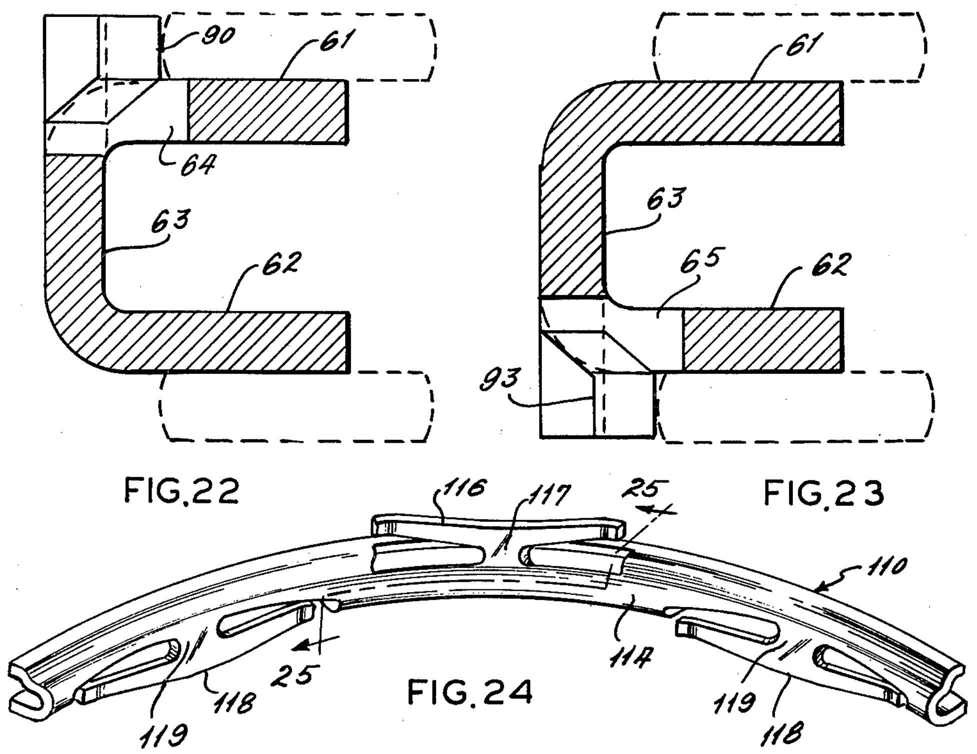
FIG. 22 is a transverse section taken on the line 22—22 of FIG. 21 illustrating a ring assembly using the spacer-expander of FIG. 21.
FIG. 23 is a transverse section taken on the line 23—23 of FIG. 21 illustrating a ring assembly using the spacer-expander of FIG. 21.
FIG. 24 is a perspective view of another modified form of a spacer-expander ring.

FIGS. 21–23, inclusive, illustrate still another form of the invention basically disclosed in FIGS. 17, 19 and 20 and the same reference characters have been used to indicate like parts. This description will be confined to the differences in order to avoid unnecessary repetition. As shown in FIG. 21, each of the root portions 66 and 67 for the cantilever fingers are alternately staggered on opposite sides of the backbone or ring portion 60. Each of the root portions, however, carries two cantilever arms, one extending chordwise in one direction and indicated as 90, and the other extending chordwise in the opposite direction and indicated as 91. The lower corresponding cantilever arms are indicated as 92 and 93 on the opposite side of the ring. Thus, each rail 75 and 76 has two resilient supporting contact surfaces closely spaced adjacent each of the root portions 66 and 67 instead of a single cantilever finger support. The particular shape of the cantilever fingers, that is, straight sided or tapered depends upon the particular requirements.

In each of the modifications shown by FIGS. 18–23, inclusive, the root portion of the cantilever finger has been shown as supported by the backbone of the control ring portion 63. It follows therefore that the twisting action of the unbalanced forces due to the offset relation of the contact between the ends of the cantilever finger and the expansible rings and the ring supporting surface on the spacer-expander ring will exert a twist upon the backbone of the ring and not upon the legs 61 and 62, as previously discussed with respect to the embodiments illustrating the invention in connection with a single ring, such as in FIGS. 1–6, inclusive. This twisting action on the backbone of the ring, however, is not without a side effect to control the axial force exerted on the rails 75 and 76. In those modifications wherein the twisting force of one finger is not cancelled out by the twisting force of an oppositely disposed finger, such as shown particularly in FIGS. 18 and 19, this effect can produce a sinuous distortion in the control ring 60 forcing the leg 61 or 62, as the case may be, axially against the rails 75 and 76 in an axial direction. And this control force may be utilized as heretofore described to effect a seal between the outer surface of the rails 75 and 76 and the radial face of the piston groove. The function, therefore, of these embodiments shown in FIGS. 19–23, inclusive, is similar in operation to those described in FIGS. 1–6, although the control ring is different structurally. From what has been said therefore, it is readily apparent that if more of the same twisting effect is desired in the rings having the U-shaped cross-section, then the punching operation is reversed so that the cantilever fingers are formed from the backbone 63 of the U-shaped ring so that the roots 66 and 67 are then a part of the leg portions 61 and 62. In such a modification, the offset forces are directed to the legs 61 and 62 with which the root portions 66 and 67 are integral, and the operation of the U-shaped expander 60 can correspond almost exactly with FIGS. 1–6, inclusive, all as shown in FIGS. 30–33 hereinafter described.

Figure 25:
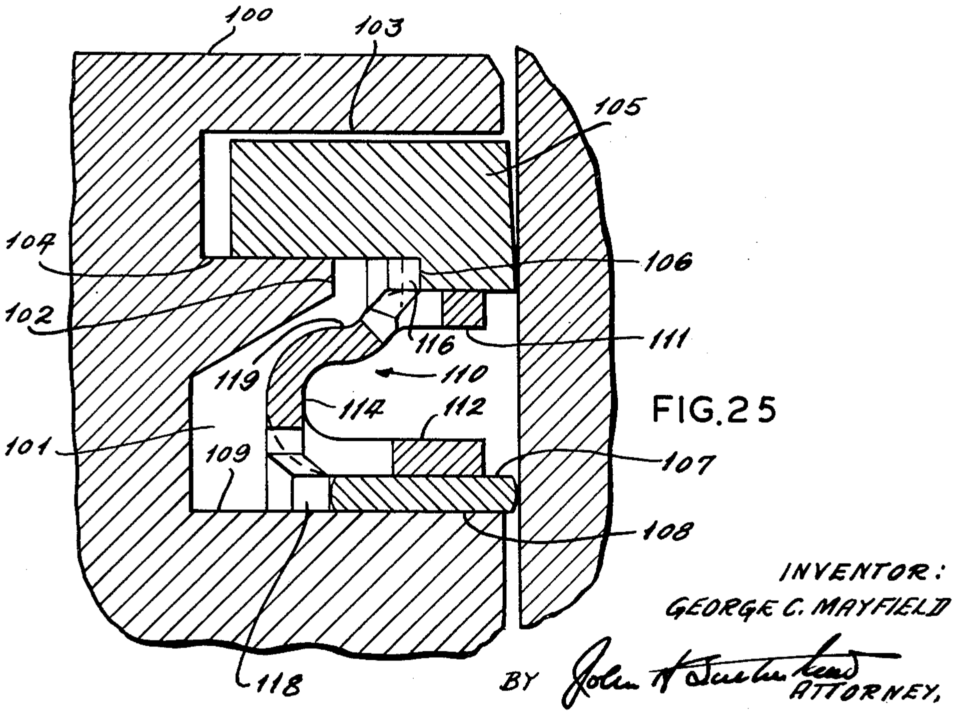
FIG. 25 is a fragmentary cross-sectional view on line 25—25 of FIG. 24 illustrating a piston ring groove with a compression ring and an oil control ring mounted in portions of the groove separated by a spacer-expander ring of the form shown in FIG. 24.

In FIGS. 24 and 25 is illustrated a combined compression and oil control ring. In order to better visualize the ring assembly, it is shown in cross-section within the groove of a piston. In FIG. 25, for example, a portion of a piston 100 has a ring groove 101 divided by a bridge, such as 102, to form guiding surfaces 103 and 104 for a compression ring 105. Compression ring 105 is formed with a circumferential step 106. Below bridge portion 102 is located an oil control ring or rail 107 with its radial face 108 slidably mounted against the bottom face of the ring groove 109. Also located in the groove 101 below the bridge 102 is a spacer-expander control ring element 110 having spaced legs 111 and 112, which extend circumferentially around the piston between the rings 105 and 107, respectively. The outer surfaces of the legs 111 and 112 act as radial supports for the rings 105 and 107, respectively. The U-shaped ring 110 also has a backbone portion 114 reinforced by corrugation 119 and connecting the legs 111 and 112 and reversely curved to stiffen the backbone. Thus, the ring assembly includes the rails 105 and 107 and the spacer-expander control ring 110, and this control ring is a full floating non-bottoming type of ring, as heretofore described. Punched out of the leg 111 and offset from the upper surface thereof are pairs of cantilever fingers 116 integral with root portion 117 joined with the backbone 114 of the control ring. The construction of the cantilever finger 116 is the same as heretofore described with reference to FIGS. 21–23, inclusive, and the operation and purpose is identical since the end of the cantilever fingers yieldably engage the step surface 106 of the ring 105, which is a split ring, urging it into contact with the cylinder wall. The ring 110 is not compressible once its ends are in interlocked-abutment, only the fingers yield. The bottom side of the control ring 110 has similar pairs of cantilever fingers 118 joined to the backbone 114 by a root portion 119 in the same manner as heretofore described with reference to FIGS. 21–23, inclusive. The ends of the cantilever fingers 118 are offset from the lower surface of the circumferential leg 112 of the control ring 110 in a direction to engage the inner periphery of the rail 107 thus maintaining the rail 107 at its outer periphery against the cylinder wall with a pressure varying in uniform manner with displacement of the ring 107 by the cylinder wall. Axial control of ring 105 is obtained in the same manner as heretofore described with respect to FIGS. 21–23, and axial control of the ring 107 by the control ring 110 is obtained in exactly the same manner as heretofore explained with reference to FIGS. 21–23, inclusive.

Figure 26:
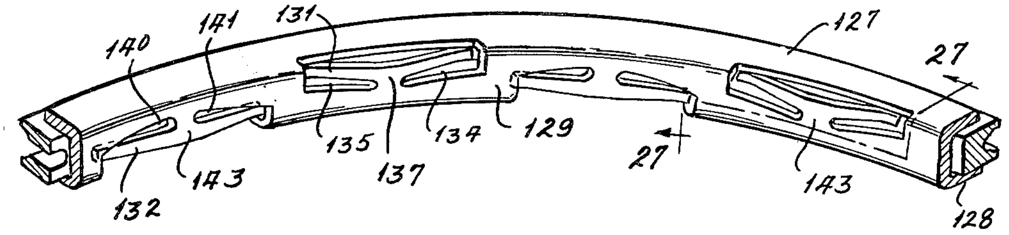
FIG. 26 is a perspective view of another modified form of a spacer-expander ring assembly.
Figure 26:
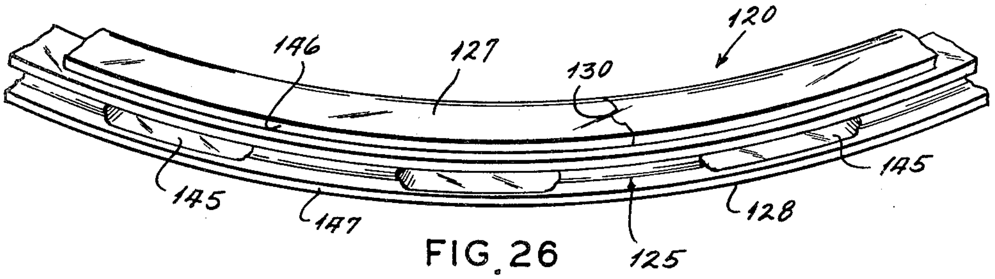
Figure 27:
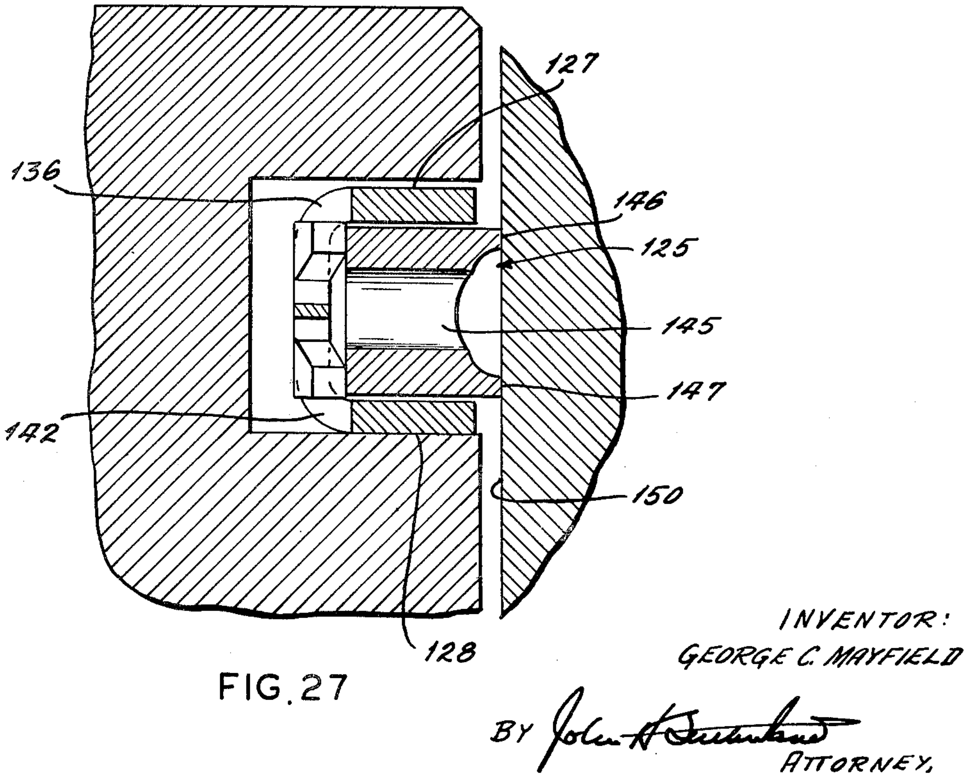
FIG. 27 is a cross-sectional view on the line 27—27 of FIG. 26 illustrating the ring assembly of FIG. 26 on a piston in a cylinder.

FIGS. 26 and 27 illustrate a piston ring assembly including a spacer-expander control ring generally indicated as 120 and an expansible ring in the form of a vented oil control ring 125. In this form, the spacer-expander control ring 120 forms a cage for the vented oil ring 125. As shown in FIG. 26, the spacer-expander control ring has a pair of upper and lower legs 127 and 128 connected in spaced relation by a backbone portion 129 forming a ring of U-shaped cross-section. The ring is split as at 130 to form opposite end surfaces for interlocked-abutment during operation of the ring. The backbone of the ring 129 is punched out as at 134, 135 and 136 to form a pair of cantilever fingers 131 which are joined to the backbone 129 by the integral root portion 137. The upper surface of the pair of cantilever spring fingers 131 have a working clearance with the under surface of the leg 127. Opposite the pairs of fingers 131, which are spaced about the inner periphery of the control ring 120, are similar pairs of fingers 132 which are formed in the same manner by punching out portions 140, 141 and 142 leaving the pairs of fingers 132 connected by a root portion 143 with the backbone 129 of the control ring 120. Pairs of fingers 131 and 132 are spaced alternately around the ring periphery. The lower edge of the pairs of fingers 132 are positioned to have working clearance with the upper surface or inner surface of the leg 128.

A control ring constructed in the above described manner is adapted for use as a cage for a piston ring of the split expansible type. For example, one type of ring 125 is illustrated here. The ring illustrated is a vented oil control type. Such a ring is well-known in the art and can be generally described as a split cast iron ring having a plurality of vent passages 145 located between rails 146 and 147. As shown in FIG. 27, the vented oil ring 125 is received between the legs 127 and 128 of the control ring 120 and it is suitably dimensioned so as to have a sliding fit between the legs 127 and 128. During operation of the ring assembly shown in FIGS. 26 and 27, the side faces of the legs 127 and 128 lie adjacent to the side faces of the groove in a piston. Preferably, the distance between the top and bottom side faces of the legs 127 and 128 is such as to give a working clearance in the piston ring groove, so that when the ends of the ring 120 are in interlocked-abutment at the joint 130, the ring 120 forms a non-yielding support floating in the ring groove of the piston. The pairs of fingers 131 and 132 bear against the inner periphery of the ring 125 and form a yielding support urging the ring 125 outwardly so that the rails 146 and 147 are pressed against the cylinder wall 150. This form of the invention differs from those heretofore described in that the piston ring is located between the legs of the control ring. This form has the advantage of isolating the side walls of the piston groove from the wear caused by movement of the ring 125 with respect to the piston. The ring 120 is usually constructed from spring steel strip, as heretofore pointed out, and, consequently, is far more resistant to wear than are the side walls of the groove in an aluminum piston. This piston ring assembly is also of the full floating type and whereas there will be movement of the assembly as such in the groove of the piston, nevertheless, the amount of movement and, consequently, the amount of wear of the groove will be less than in the case where the piston ring is actually supported by the side walls of the groove in the aluminum piston.

Figure 28:
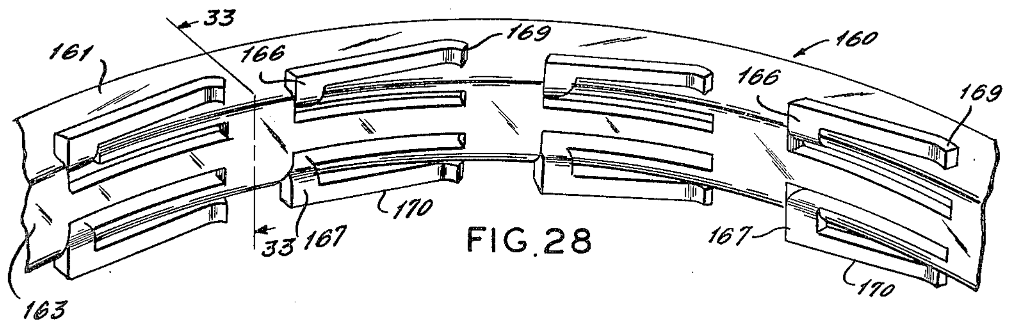
FIG. 28 is a fragmentary perspective view of another form of the ring shown in FIG. 18.
Figure 31:
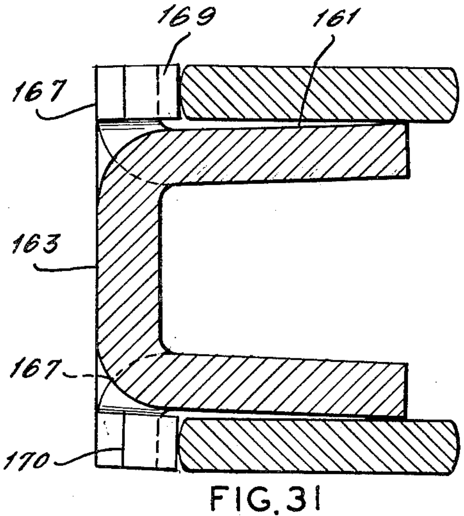
FIG. 31 is a transverse section of a piston ring assembly taken on line 33—33 of FIG. 30 in the direction of the arrows.

FIGS. 28 and 31 illustrate still another form of the invention and represent a reversal of the parts shown in FIG. 18. For this reason, the same parts will be indicated by the same reference character with 100 added and this description will be limited to the differences.

Top and bottom cantilever fingers 169 and 170 are arranged with respect to control ring 160 in exactly the same way as in FIG. 18, but there is a difference. Fingers 169 and 170 are struck out of the backbone 163 instead of out of the legs or webs 161 and 162 and the roots 166 and 167 form a continuation of the legs or webs 161 and 162. This change makes a great deal of difference in the function of the control ring 160. The legs 161 and 162 do not have to diverge an amount such as 3–6 thousandths of an inch because the forces between rails 175 and 176 and fingers 169 and 170 are transferred through the roots 166 and 167 to twist the legs or webs 161 and 162, as shown in FIG. 31. This twist imposes a resilient force to hold the piston rings 175 and 176 in sealing relation to the sides of the piston ring groove. This resilient force is proportional to the relation between short lever arm 166 and longer lever arm, leg 161 or short lever arm 167 and longer lever arm 162. In this respect, the control ring 160 functions like the modification in FIG. 7, but, of course, has two legs 161 and 162 biased oppositely instead of one leg 16, such as shown in FIG .7.

Figure 29:
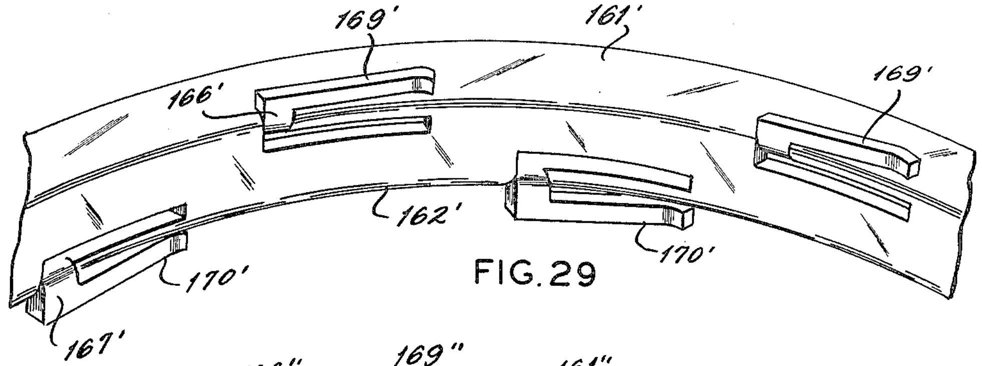
FIG. 29 is a fragmentary perspective view of another form of the ring shown in FIG. 20.

FIG. 29 illustrates still another form of the invention in which the parts shown in FIG. 20 have been reversed. As pointed out, FIG. 20 is substantially identical with FIG. 18 and FIG. 29 bears the same relationship to FIG. 28. Consequently, the same reference characters are used with a prime added. This description will be confined to the differences between FIGS. 28 and 29. As in FIG. 28, the roots 166′ and 167′ are a continuation of webs or legs 161′ and 162′, and consequently, in operation, the forces between fingers 169′ and 170′ and the piston rings top and bottom will bias the legs 161′ and 162′ apart as above described. In addition, the cutouts for the fingers are in the backbone 163′ of the control ring thereby making it readily flexible so that undulating surfaces on the legs or webs will resemble the effect depicted in FIGS. 7 and 8 because of the staggered relation of the fingers.

Figure 30:
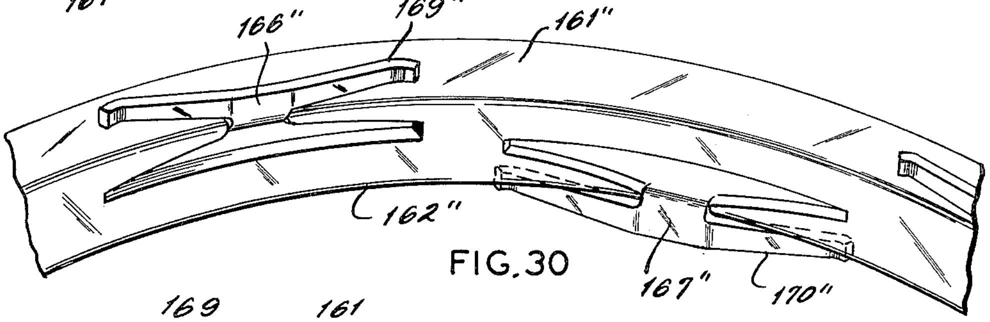
FIG. 30 is a fragmentary perspective view of another form of the ring shown in FIG. 21.

FIG. 30 shows the same control ring as in FIG. 29 with pairs of fingers. The operation of FIGS. 28–31 is the same as that described for FIGS. 1–6 and 18–23.

Enough has been said here about the specific embodiments to teach one skilled in the art to construct a control ring with varying degrees of radial control which will produce any desired kind or degree of axial control for a piston ring, and changes in and modifications of the constructions described may be made without departing from the spirit of this invention or sacrificing its advantages.

Having thus described the invention, what is claimed and desired to be secured by Letters Patent is:

1. In combination with a piston having a ring groove, a ring assembly including a cylinder-engaging ring element and a spacer-expander having a side face for engagement with said cylinder-engaging ring element, the improvement which comprises, said spacer-expander:

(i) having gap-ends abutting each other when the internal periphery thereof is greater than the external periphery of the bottom, but less than the external periphery of the land, of said ring groove, (ii) being circumferentially incompressible when said gap-ends abut, (iii) having a plurality of peripherally spaced tabs extending axially beyond the side face thereof at the inner periphery thereof, and a resilient finger cantilevered from at least some of said tabs and extending substantially peripherally therefrom for a distance substantially greater than the peripheral dimension of said tabs, said fingers lying in substantial part axially beyond said side face and disposed to engage the inner periphery of said cylinder-engaging ring element.

2. The improvement of claim 1 wherein said spacer-expander has upper and lower side faces for engagement respectively with different cylinder-engaging ring elements, and wherein some of said tabs extend axially beyond the upper side face and others thereof beyond the lower side face of said spacer-expander.

3. The improvement of claim 1 wherein said tabs incline toward the axis of said piston.

4. The improvement of claim 1 wherein said spacer-expander comprises axially spaced parallel flanges interconnected by a web, and at least one of said flanges constitutes said side face for engagement with a cylinder-engaging ring element.

5. The improvement of claim 4 wherein each flange constitutes a side face for engagement with a cylinder-engaging ring, and fingered tabs extend in opposite directions from said web to engage cylinder-engaging ring elements on the respective side faces.

6. The improvement of claim 5 in which the tabs at the upper and lower side faces are in substantial axial alignment with each other.

7. The improvement of claim 5 wherein the tabs at the upper and lower side faces are in substantial disalignment in the axial direction.

8. The improvement of claim 1 wherein resilient fingers extend in opposite directions from a given tab.

9. The improvement of claim 5 wherein said resilient fingers project in opposite directions from a given tab.

10. The improvement of claim 4 wherein the medial faces of said flanges constitute side faces for engagement with a cylinder-engaging ring element and said cylinder-engaging ring element is disposed between said side faces.

References Cited by the Examiner

UNITED STATES PATENTS

| | | | |
|---|---|---|---|
| 1,760,974 | 6/30 | Blaeker et al. | 277—119 |
| 2,670,256 | 2/54 | Hsia-Si Pien | 277—139 |
| 2,837,385 | 6/58 | Mayfield | 277—140 |
| 2,893,798 | 7/59 | Olson | 277—139 |
| 3,024,029 | 3/62 | Brenneke | 277—139 |

FOREIGN PATENTS

| | | |
|---|---|---|
| 825,782 | 12/37 | France. |

LEWIS J. LENNY, *Primary Examiner.*

SAMUEL ROTHBERG, *Examiner.*